United States Patent
Lenzing et al.

(10) Patent No.: US 6,871,533 B2
(45) Date of Patent: *Mar. 29, 2005

(54) FLOWMETER WITH ELEMENT FOR REDUCING THE FORMATION OF TURBULENCE IN THE FLOWING MEDIUM

(75) Inventors: Thomas Lenzing, Benningen (DE); Dieter Tank, deceased, late of Kornwestheim (DE); by Anke Fleischer, legal representative, Kornwestheim (DE); by Eva Tank, legal representative, Marburg (DE); Uwe Konzelmann, Asperg (DE); Richard Joschko, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 96 days.

This patent is subject to a terminal disclaimer.

(21) Appl. No.: 10/088,841
(22) PCT Filed: Jul. 17, 2001
(86) PCT No.: PCT/DE01/02669
§ 371 (c)(1), (2), (4) Date: Dec. 9, 2002
(87) PCT Pub. No.: WO02/08700
PCT Pub. Date: Jan. 31, 2002

(65) Prior Publication Data
US 2004/0045370 A1 Mar. 11, 2004

(30) Foreign Application Priority Data
Jul. 21, 2000 (DE) .......................................... 100 35 543

(51) Int. Cl.⁷ .................................................. G01F 1/68
(52) U.S. Cl. .................................................... 73/202.5
(58) Field of Search .......................... 73/202.5, 204.21, 73/204.11, 204.22

(56) References Cited

U.S. PATENT DOCUMENTS

| 5,303,584 A | 4/1994 | Ogasawara |
| 6,619,114 B1 | 9/2003 | Lenzing et al. |
| 6,647,775 B1 * | 11/2003 | Hecht et al. ............... 73/202.5 |

FOREIGN PATENT DOCUMENTS

| DE | 199 13 654 | 10/1999 |
| DE | 199 42 502 | 3/2001 |

* cited by examiner

Primary Examiner—Edward Lefkowitz
Assistant Examiner—Jewel Thompson
(74) Attorney, Agent, or Firm—Kenyon & Kenyon

(57) ABSTRACT

Devices for determining at least one parameter of a flowing medium having an inner pipe according to the related art have the disadvantage that whirls are formed, which causes increased signal noise at the measuring element and pressure drop. A device (1) is described which has an element (11) that reduces the whirl formation in the flowing medium.

6 Claims, 1 Drawing Sheet

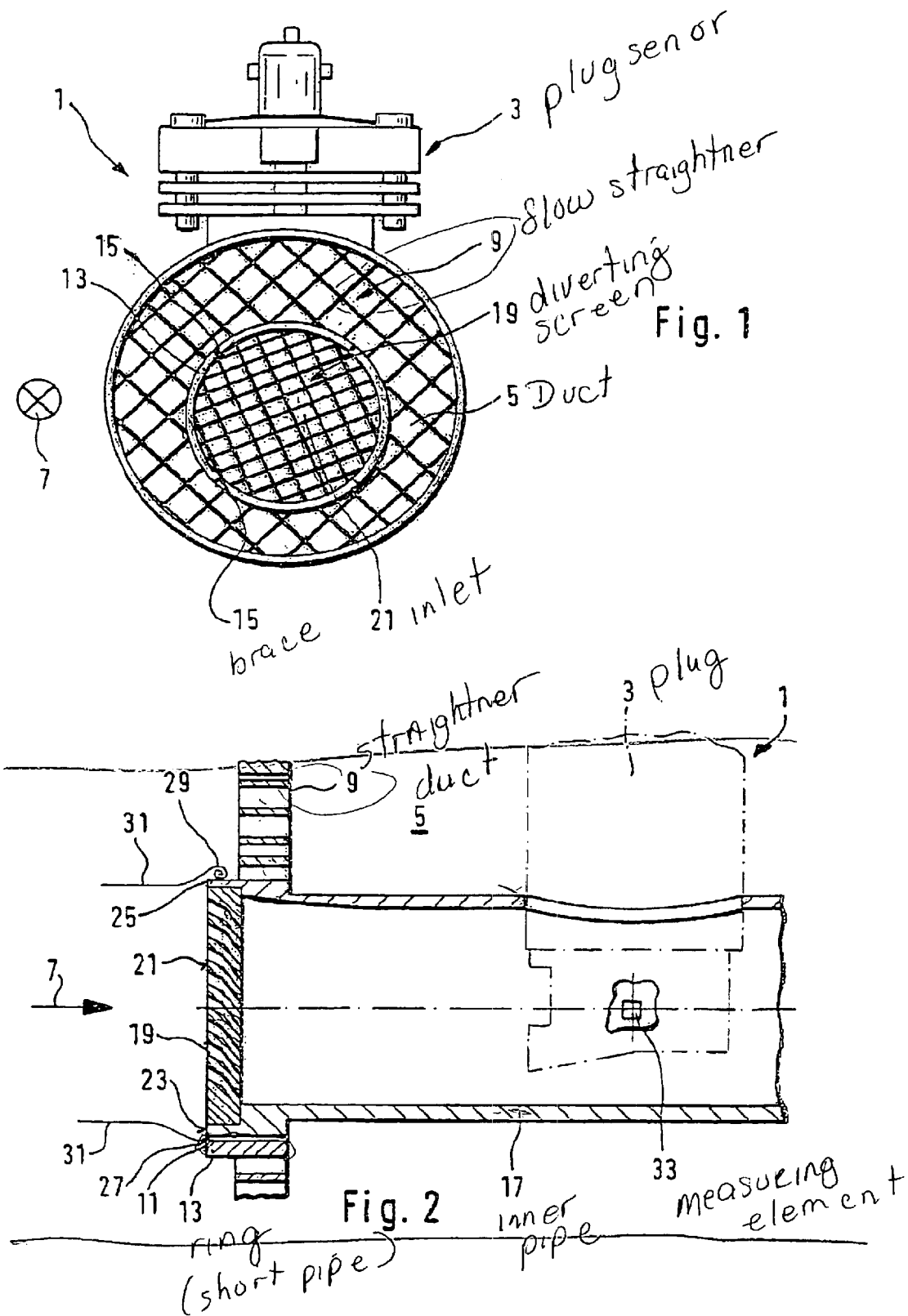

FLOWMETER WITH ELEMENT FOR REDUCING THE FORMATION OF TURBULENCE IN THE FLOWING MEDIUM

BACKGROUND INFORMATION

The present invention is based on a device for determining at least one parameter of a medium flowing in a duct according to the preamble of claim 1.

German Patent Application 197 35 664 A1 describes a device in which a plug sensor having a measuring element is situated within a pipe through which the medium flows, an upstream end of the pipe extending to a filter chamber. However, whirls are formed in the area of the incident-flow edge of the inner pipe, resulting in increased signal noise at the measuring element.

German Patent Application 196 52 753 A1 describes a device having a measuring element, which contains a flow straightener for straightening the flow and a screen for stabilizing a measuring signal. However, no inner pipe is used in this device to protect the measuring element against the effect of dirt particles or water droplets.

SUMMARY OF THE INVENTION

The device according to the present invention having the characterizing features of claim 1 has the advantage compared to the related art that the pressure drop and signal noise are reduced in a simple manner.

Advantageous refinements of and improvements on the device named in claim 1 are made possible by the measures given in the dependent claims.

It is advantageous to situate a incident-flow edge of a barrel ring at approximately the same axial length as an external incident-flow edge of the inner pipe, since the barrel ring must only be extended in the axial direction.

DRAWING

An exemplary embodiment of the present invention is schematically illustrated in the drawing and explained in detail in the description that follows.

FIG. 1 shows an exemplary embodiment of a device designed according to the present invention;

FIG. 2 shows an axial cross-section of FIG. 1.

DESCRIPTION OF THE EXEMPLARY EMBODIMENT

FIG. 1 shows a device 1 designed according to the present invention in front view. Device 1 includes a duct 5, into which a plug sensor 3 may be inserted, for example. A medium flows in duct 5 in the flow direction 7. i.e., in a direction which is perpendicular to the plane of the drawing. A flow straightener 9, secured in duct 5, is situated upstream from plug sensor 3, for example. A barrel ring 13, for example, a short pipe element, used to secure an inner pipe 17, is connected to flow straightener 9, for example. Barrel ring 13 has at least one brace 15, which connects barrel ring 13 to inner pipe 17 or a diverting screen 19, securing inner pipe 17 in flow straightener 9 or in duct 5. Inlet opening 21 area of inner pipe 17 has diverting screen 19, for example. Diverting screen 19 is used to reduce the effect of foreign particles such as liquid or solid particles, for example, on measuring element 33 situated downstream (FIG. 2). The design of such a measuring element 33 is sufficiently known to those skilled in the art, for example, from German Patent Application 195 24 634 A1, whose disclosure is an integral part of the present Patent Application.

FIG. 2 shows an axial cross section of device 1 of FIG. 1.

Inner pipe 17 has a central axis 18. The top of FIG. 2 (part of inner pipe 17 between central axis 18 and plug sensor 3) shows the related art without element 11 and the bottom of FIG. 2 shows the embodiment according to the present invention having element 11.

At the periphery of its end face 23, inner pipe 17 forms an outer incident-flow edge 25, around which the medium flows. Barrel ring 13 has an inner incident-flow edge 27.

In this embodiment, flow straightener 9 is situated downstream from inlet opening 21. Therefore, in the area of incident-flow edge 25, whirls 29 are formed according to the related art, as a flow line 31 indicates in FIG. 2. This results in increased signal noise at measuring element 33 and a higher pressure drop in duct 5 and inner pipe 17.

An element 11 is situated in the proximity of the outer incident-flow edge 25 of inner pipe 17, for example, on inner pipe 17, and reduces the whirl formation in the flowing medium. This may take place, for example, by applying an additional streamline-shaped elevation on inner pipe 17, which accelerates the flowing medium.

If incident-flow edge 27 of barrel ring 13 is approximately at the same axial height as outer incident-flow edge 25 of inner pipe 17, these whirls 29 are also no longer formed, since the area of passage for the flow in duct 5 is reduced at approximately the axial height of inlet opening 21 and the flowing medium is accelerated, whereby the whirl formation or the number of whirls formed is reduced. Depending on the flow conditions, whirls rotating in the opposite direction may also be formed, compensating the other, interfering, whirls according to the related art. With this design of barrel ring 13, element 11 is formed in order to reduce the whirl formation.

Thus, the flow in and around inner pipe 17 is stabilized, and the signal noise at measuring element 33 and the pressure drop are reduced.

Measuring element 33, which determines at least one parameter of a flowing medium, is situated within plug sensor 3. Parameters of a flowing medium include the air volume flow rate for determining an air mass, a temperature, a pressure, a concentration of a medium component, or a flow velocity, which are determined using appropriate sensors. Device 1 can be used for determining further parameters. This can be accomplished by using two or more sensors, one sensor being capable of determining two or more parameters.

What is claimed is:

1. A device for determining at least one parameter of a medium flowing in a duct, comprising:

an inner pipe at least partially situated in the duct, the inner pipe having an inlet opening;

at least one plug sensor in the inner pipe, the at least one plug sensor containing at least one measuring element for determining the at least one parameter of the flowing medium;

an element for reducing a whirl formation in the flowing medium, the element being situated in an area of the inlet opening of the inner pipe; and a barrel ring at least partially securing the inner pipe in the duct, the barrel ring having an inner incident-flow edge about at the same axial length as an outer incident-flow edge of the inner pipe, forming the element for reducing the whirl formation.

2. The device according to claim 1, wherein the duct has a flow straightener at about the same axial length of the inlet opening.

3. The device according to claim 2, wherein the barrel ring is coupled to the flow straightener.

4. The device according to claim 1, wherein the inner pipe has a diverting screen in an area of the inlet opening.

5. The device according to claim 1, wherein the at least one parameter includes a volume flow rate.

6. The device according to claim 1, wherein the medium flowing in internal combustion engine.

* * * * *

UNITED STATES PATENT AND TRADEMARK OFFICE
CERTIFICATE OF CORRECTION

PATENT NO. : 6,871,533 B2  
DATED : March 29, 2005  
INVENTOR(S) : Thomas Lenzing et al.

It is certified that error appears in the above-identified patent and that said Letters Patent is hereby corrected as shown below:

Title page,  
Item [57], ABSTRACT,  
Line 5, delete "(1)(11)".

Column 1,  
Line 5, change "BACKGROUND INFORMATION" to -- FIELD OF THE INVENTION --.  
Line 8, change "is based on" to -- relates to --.  
Line 9, change "in a duct" to -- in a duct. --.  
Line 10, delete "according to the preamble of claim 1.".  
Between lines 10 and 11, insert -- BACKGROUND INFORMATION --.  
Line 19, change "Application 196 52 793 A1" to -- Application No. 196 52 753 --.  
Lines 28-29, delete "having the characterizing features of claim 1 --.  
Lines 33-35, delete "Advantageous refinements…the dependent claims".  
Line 42, change "the present invention;" to -- the present invention. --.  
Lines 52-53, change "DESCRIPTION OF THE EXEMPLARY EMBODIMENT" to -- DETAILED DESCRIPTION --.  
Line 60, change "A flow straightener 9," to -- A flow straightener (stabilizer) 9, --.  
Line 66, change "Inlet opening 21" to -- Inlet (inflow) opening 21 --.

Column 2,  
Line 6, change "Application 195 24 63 A1 whose disclosure is" to -- Application No. 195 24 63 disclosure of which is --.  
Lines 6-7, change "an integral part of the present Patent Application." to -- hereby expressly incorporated by reference herein. --.  
Line 55, change "volume flow rate" to -- volume flow rate (volumetric flow) --.

Signed and Sealed this

Eighth Day of November, 2005

JON W. DUDAS  
*Director of the United States Patent and Trademark Office*